(12) United States Patent
Sakai et al.

(10) Patent No.: US 8,956,772 B2
(45) Date of Patent: Feb. 17, 2015

(54) FUEL CELL, AND POWER SUPPLY DEVICE AND ELECTRONIC APPARATUS USING THE SAME

(75) Inventors: Hideki Sakai, Kanagawa (JP); Takaaki Nakagawa, Kanagawa (JP); Masaya Kakuta, Kanagawa (JP); Yuichi Tokita, Kanagawa (JP)

(73) Assignee: Sony Corporation, Tokyo (JP)

( * ) Notice: Subject to any disclaimer, the term of this patent is extended or adjusted under 35 U.S.C. 154(b) by 430 days.

(21) Appl. No.: 12/745,603

(22) PCT Filed: Nov. 19, 2008

(86) PCT No.: PCT/JP2008/071000
§ 371 (c)(1),
(2), (4) Date: Jun. 1, 2010

(87) PCT Pub. No.: WO2009/072396
PCT Pub. Date: Jun. 11, 2009

(65) Prior Publication Data
US 2010/0310946 A1    Dec. 9, 2010

(30) Foreign Application Priority Data
Dec. 7, 2007    (JP) ................ P2007-317488

(51) Int. Cl.
*H01M 8/06*    (2006.01)
*H01M 4/86*    (2006.01)
*H01M 8/04*    (2006.01)
*H01M 8/16*    (2006.01)

(52) U.S. Cl.
CPC ............ *H01M 4/86* (2013.01); *H01M 8/04186* (2013.01); *H01M 8/16* (2013.01); *Y02E 60/527* (2013.01)
USPC .......................................... 429/408

(58) Field of Classification Search
USPC .......................................... 429/408
See application file for complete search history.

(56) References Cited

U.S. PATENT DOCUMENTS

| | | | |
|---|---|---|---|
| 6,447,941 B1 * | 9/2002 | Tomimatsu et al. | 429/452 |
| 2005/0053825 A1 | 3/2005 | Sakai et al. | |
| 2007/0196722 A1 * | 8/2007 | Tomita et al. | 429/43 |

FOREIGN PATENT DOCUMENTS

| | | |
|---|---|---|
| JP | 2000-133297 | 5/2000 |
| JP | 2000-268836 | 9/2000 |
| JP | 2001-208719 | 8/2001 |
| JP | 3413111 | 3/2003 |
| JP | 2004-71559 | 3/2004 |

* cited by examiner

*Primary Examiner* — Karie O'Neill Apicella
(74) *Attorney, Agent, or Firm* — K&L Gates LLP

(57) ABSTRACT

To provide a fuel cell that can perform efficient power generation through a simple fuel supply. There is provided a fuel cell that generates electricity through progress of an oxidation-reduction reaction using an enzyme as a catalyst, the fuel cell including at least a fuel-vaporizing layer formed through vaporization of a fuel; an anode to which a vaporized fuel is supplied from the fuel-vaporizing layer; and a cathode connected to the anode in a state in which protons can be conducted. In the fuel cell, since a fuel is supplied to an electrode in a vaporized state, a vaporized fuel is supplied to an inner portion of the electrode and a reaction sufficiently proceeds at the inner surface of the electrode, which can achieve high output due to efficient power generation. Furthermore, even if an enzyme or the like is immobilized on an electrode, the enzyme or the like can be prevented from leaching out into a liquid fuel because a fuel is supplied to the electrode in a vaporized state, which can prevent a decrease in the output caused by leaching out of the enzyme or the like.

13 Claims, 5 Drawing Sheets

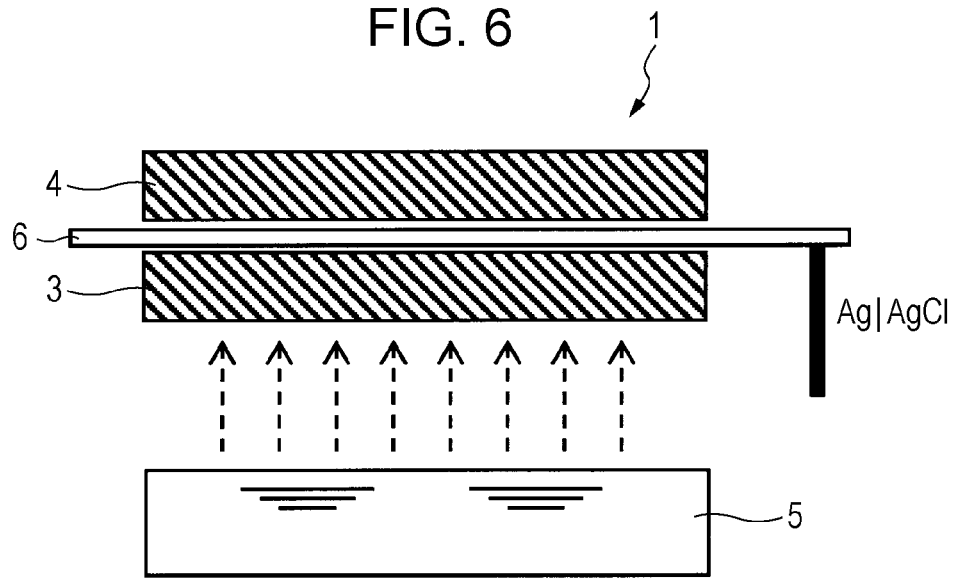
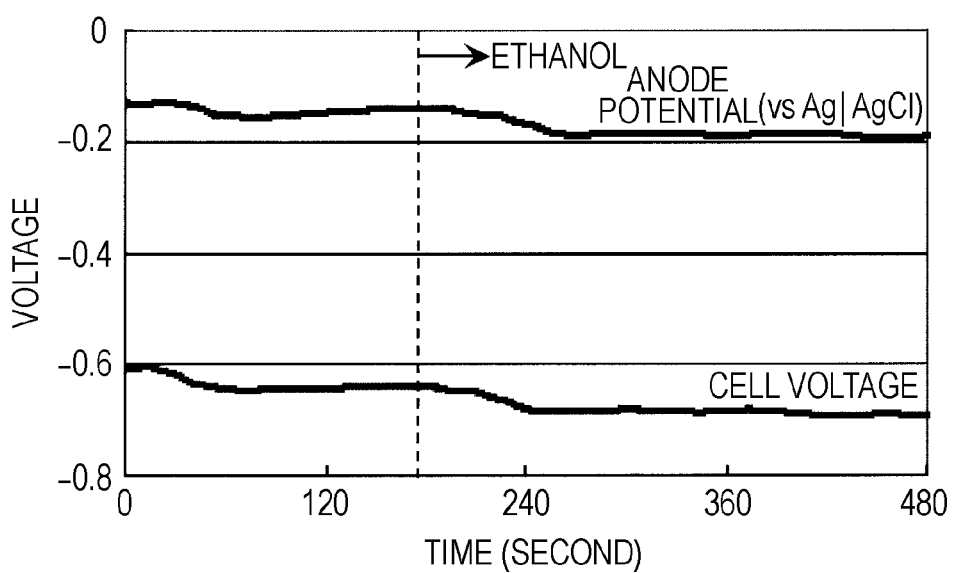

US 8,956,772 B2

FUEL CELL, AND POWER SUPPLY DEVICE AND ELECTRONIC APPARATUS USING THE SAME

CROSS REFERENCE TO RELATED APPLICATIONS

The present application is a national stage of International Application No. PCT/JP2008/071000 filed on Nov. 19, 2008 and claims priority to Japanese Patent Application No. 2007-317488 filed on Dec. 7, 2007 the disclosures of which are incorporated herein by reference.

BACKGROUND

The present invention relates to a fuel cell. More specifically, the present invention relates to a fuel cell that generates electricity through progress of an oxidation-reduction reaction using an enzyme as a catalyst, the fuel cell achieving high output or the like through a simple fuel supply, and to a power supply device and an electronic apparatus using the fuel cell.

In recent years, fuel cells (hereinafter referred to as biofuel cells) in which a microbe or an oxidation-reduction enzyme that functions as a catalyst is immobilized on at least one of the anode and the cathode have received attention as next-generation fuel cells with high capacity and safety. This is because, in biological metabolism in a living body, high-efficiency energy conversion is performed at room temperature and thus high-efficiency power generation with high safety can be achieved; and by using an enzyme having substrate specificity, electrons can be efficiently extracted from a fuel such as glucose or ethanol with which a reaction cannot be easily caused using a typical industrial catalyst.

For example, in aspiration of microbes or cells, saccharides, proteins, fat, and the like are converted into electric energy by reducing nicotinamide adenine dinucleotide (hereinafter referred to as "$NAD^+$") to reduced nicotinamide adenine dinucleotide (hereinafter referred to as "NADH") in a process of producing carbon dioxide through a glycolytic pathway and a tricarboxylic acid cycle.

Furthermore, in photosynthesis, by absorbing light energy, nicotinamide adenine dinucleotide phosphate (hereinafter referred to as "$NADP^+$") is reduced to reduced nicotinamide adenine dinucleotide phosphate (hereinafter referred to as "NADPH"), and thus the light energy is converted into electric energy.

As described above, in biological metabolism, since chemical energy including nutrients such as saccharides, fat, and proteins and light energy is converted into electric energy, fuel cells using such conversion have been developed.

For example, Japanese Unexamined Patent Application Publication No. 2000-133297 discloses a power generation method and a cell that use microbes or cells and an electrode used for the power generation method and the cell, the electrode being obtained by immobilizing an electron mediator. Furthermore, Japanese Unexamined Patent Application Publication No. 2001-208719 discloses an enzyme electrode obtained by immobilizing an oxidation-reduction enzyme in or on a polydialkylsiloxane film formed on a substrate electrode. Japanese Unexamined Patent Application Publication No. 2004-71559 discloses a fuel cell having a mechanism with which NADH is produced from alcohols or saccharides using $NAD^+$-dependent dehydrogenase.

Herein, FIG. 9 is a diagram showing a reaction scheme of a biofuel cell. In the biofuel cell using glucose as a fuel and shown in FIG. 9, an oxidation reaction of glucose occurs at the anode and a reduction reaction of oxygen ($O_2$) in the air occurs at the cathode. In addition, at the anode, electrons migrate in the order of glucose, glucose dehydrogenase, nicotinamide adenine dinucleotide ($NAD^+$), diaphorase, a mediator, and an electrode (carbon).

Such power generation in biofuel cells have been conventionally performed by supplying a fuel in an aqueous solution state into an electrode.

For example, in Japanese Unexamined Patent Application Publication No. 2000-133297, a fuel is supplied by filling an anode cell with 0.1 M phosphate buffer solution (pH 7) containing 10 µM glucose (refer to paragraph 0040 of Japanese Unexamined Patent Application Publication No. 2000-133297). Furthermore, in Japanese Unexamined Patent Application Publication No. 2001-208719, power generation is performed by inserting an electrode coated with a polydimethylsiloxane film into 0.1 mol/L phosphate buffer solution (pH 7) (refer to paragraph 0013 of Japanese Unexamined Patent Application Publication No. 2001-208719). Furthermore, in Japanese Unexamined Patent Application Publication No. 2004-71559, power generation is performed by adding 1 M methanol or the like to 3 mL of 0.1 M tris-hydrochloric acid buffer solution (pH 7.0, I.S.=0.3) (refer to paragraph 0066 of Japanese Unexamined Patent Application Publication No. 2004-71559).

In an existing biofuel cell, since a fuel is supplied into an electrode in an aqueous solution state, a fuel solution with high concentration is not smoothly supplied into the electrode. Thus, even if an electrode designed so as to have a porous structure is used to increase the supply efficiency of the fuel, a reaction does not sufficiently proceed at the inner surface of the electrode, which poses a problem in that an output is decreased.

In addition, the occurrence of a phenomenon in which an enzyme, a microbe, a coenzyme, an electron-transferring mediator, or the like immobilized on an electrode leaches out into a fuel solution causes a problem in that an output is decreased.

Accordingly, a principal object of the present invention is to provide a fuel cell that can achieve high output or the like by a simple fuel-supplying method.

SUMMARY

First, in the present invention, there is provided a fuel cell that generates electricity through progress of an oxidation-reduction reaction using an enzyme as a catalyst, the fuel cell including at least:

a fuel-vaporizing layer formed through vaporization of a fuel;

an anode to which a vaporized fuel is supplied from the fuel-vaporizing layer; and a cathode connected to the anode in a state in which protons can be conducted.

The fuel cell according to the present invention may further include an anode current collector through which the fuel can pass, the anode current collector being connected to the anode; and a cathode current collector through which oxygen can pass, the cathode current collector being connected to the cathode.

Moreover, the fuel cell according to the present invention may further include a fuel-storing member that stores the fuel in a liquid state.

The structures of the anode and the cathode included in the fuel cell according to the present invention are not particularly limited. The anode may be formed such that an air layer through which the vaporized fuel can pass is formed inside the anode, and the cathode may be formed such that an air layer through which air can pass is formed inside the cathode.

Moreover, the anode and/or the cathode may be formed so as to have a porous structure.

Moreover, an electrolyte layer having proton conductivity may be stacked on a surface of the anode and/or the cathode.

In the anode and/or the cathode, the oxidation-reduction reaction proceeds with an enzyme functioning as a catalyst, and the enzyme may be immobilized on the anode and/or the cathode.

In this case, a method for immobilizing the enzyme is not particularly limited. For example, a method for immobilizing the enzyme on the electrolyte layer is exemplified.

The enzyme immobilized on the anode and/or the cathode is not particularly limited. For example, an oxidase is exemplified.

Moreover, an electron-transferring mediator may be immobilized on the anode and/or the cathode.

The enzyme immobilized on the anode may include at least an oxidized coenzyme.

When the enzyme immobilized on the anode includes the oxidized coenzyme, the enzyme may further include a coenzyme oxidase.

Next, in the present invention, there is provided a power supply device in which at least two of the fuel cells described above are connected in series.

Furthermore, in the present invention, there is provided an electronic apparatus that uses at least one fuel cell that generates electricity through progress of an oxidation-reduction reaction using an enzyme as a catalyst, the electronic apparatus is characterized in that:

the at least one fuel cell includes at least:
    a fuel-vaporizing layer formed through vaporization of a fuel;
    an anode to which a vaporized fuel is supplied from the fuel-vaporizing layer; and
    a cathode connected to the anode in a state in which protons can be conducted.

In the fuel cell according to the present invention, since a fuel is supplied to an electrode in a vaporized state, the vaporized fuel is efficiently supplied to an inner portion of the electrode and a reaction sufficiently proceeds at the inner surface of the electrode, which can achieve high output due to efficient power generation.

Furthermore, even if an enzyme or the like is immobilized on an electrode, the enzyme or the like can be prevented from leaching out into a liquid fuel because a fuel is supplied to the electrode in a vaporized state, which can prevent a decrease in the output caused by leaching out of the enzyme or the like. As a result, the reaction efficiency on the electrode is improved.

Additional features and advantages of the present invention are described in, and will be apparent from, the following Detailed Description and the Figures.

BRIEF DESCRIPTION OF FIGURES

FIG. 6 is a schematic sectional view of a fuel cell according to the present invention, the fuel cell being used in Example 1.

FIG. 7 is a graph substituted for drawing and showing changes in an anode potential and a cell voltage over time in Example 1.

DETAILED DESCRIPTION

Hereinafter, preferred embodiments for carrying out the present invention will be described with reference to the attached drawings. Note that the embodiments described below are mere examples of representative embodiments of the present invention and in no way limit the scope of the present invention.

<Fuel Cell>

Figure 1:
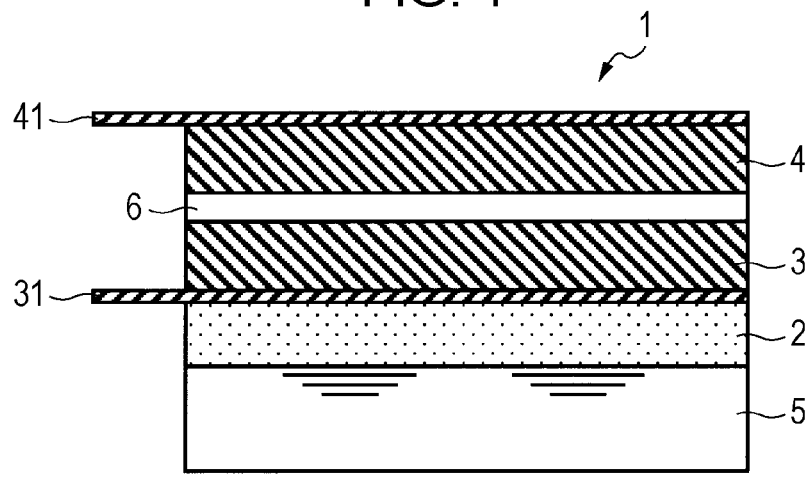
FIG. 1 is a schematic sectional view showing an embodiment (first embodiment) of a fuel cell 1 according to the present invention.

FIG. 1 is a schematic sectional view showing an embodiment (first embodiment) of a fuel cell according to the present invention. A fuel cell 1 according to the present invention broadly includes at least a fuel-vaporizing layer 2, an anode 3, and a cathode 4. The anode 3 and the cathode 4 are connected to each other in a state in which protons can be conducted. Hereinafter, the structures, functions, and effects thereof are described.

(1) Fuel-Vaporizing Layer 2

The fuel-vaporizing layer 2 is formed through vaporization of a fuel. In this embodiment, a fuel-storing member 5 is disposed on the fuel cell 1, whereby a fuel is stored in the fuel-storing member 5 and the fuel-vaporizing layer 2 is formed through vaporization of the fuel. However, the fuel-storing member 5 is not necessarily required for the fuel cell 1 according to the present invention. For example, the fuel-vaporizing layer 2 can be formed by supplying a vaporized fuel to the fuel cell 1 directly from the outside or by attaching a removable fuel cartridge or the like filled with a fuel to the fuel cell 1 and vaporizing the fuel.

A method for vaporizing a fuel is not particularly limited and can be freely selected in accordance with the types of fuel. Examples of the method include a method in which a fuel is vaporized with external heat such as a change in atmospheric temperature or artificial heating and a method in which the heat generated inside the fuel cell 1 is used as volatilization heat.

As described above, in the fuel cell 1 according to the present invention, since power generation is performed by supplying a vaporized fuel, the percentage of the fuel infiltrating into the electrode can be increased compared with the case where a liquid fuel is used, which can achieve high output of the fuel cell 1.

In addition, the fuel supply to the electrode and the control thereof can be easily performed by using such a vaporized fuel. Moreover, the energy density of the fuel-storing member 5 can be increased.

Furthermore, even if an enzyme, a microbe, a coenzyme, an electron-transferring mediator, or the like is immobilized on the electrode, they can be prevented from leaching out into a liquid fuel because the liquid fuel does not contact the electrode. Consequently, a reaction efficiency at the electrode is increased and thus efficient power generation can be achieved.

The type of fuel that can be supplied to the fuel cell 1 according to the present invention is not particularly limited as long as the fuel can be vaporized, and publicly known fuels can be freely employed. For example, ethanol, methanol, an organic acid, or the like can be used.

Furthermore, when a fuel that can be vaporized and is edible, drinkable, or safe for contact with the human body is used, a fuel cell 1 with higher safety can be obtained. Examples of the fuel include beverages such as juices, sport drinks, sugared water, and alcoholic beverages, and cosmetic products such as lotions. Moreover, if beverages, cosmetic products, and the like that people use in everyday life are used as a fuel of the fuel cell 1 according to the present invention, there is an advantage that an arbitrary fuel can be supplied at any place, in addition to the fuel being safe.

(2) Anode 3

At the anode 3 of the fuel cell 1 according to the present invention, electrons are released through the progress of an oxidation reaction of a fuel (hereinafter referred to as "vaporized fuel") that has been vaporized and is supplied from the fuel-vaporizing layer.

A material used for the anode 3 can be any publicly known material and is not particularly limited as long as the material can be electrically connected to the outside. Examples of the material include metals such as Pt, Ag, Au, Ru, Rh, Os, Nb, Mo, In, Ir, Zn, Mn, Fe, Co, Ti, V, Cr, Pd, Re, Ta, W, Zr, Ge, and Hf; alloys such as alumel, brass, duralumin, bronze, nickelin, platinum-rhodium, hyperco, permalloy, permendur, nickel silver, and phosphor bronze; conductive polymers such as polyacetylenes; carbon materials such as graphite and carbon black; borides such as $HfB_2$, $NbB$, $CrB_2$, and $B_4C$; nitrides such as TiN and ZrN; silicides such as $VSi_2$, $NbSi_2$, $MoSi_2$, and $TaSi_2$; and composite materials of these.

An enzyme may be optionally immobilized on the anode 3. For example, in the case where a fuel containing alcohols is used as the fuel, an oxidase that oxidatively decomposes the alcohols may be immobilized. Examples of the oxidase include alcohol dehydrogenase, aldehyde reductase, aldehyde dehydrogenase, lactate dehydrogenase, hydroxypyruvate reductase, glycerate dehydrogenase, formate dehydrogenase, fructose dehydrogenase, galactose dehydrogenase, glucose dehydrogenase, gluconate 5-dehydrogenase, and gluconate 2-dehydrogenase.

Furthermore, in addition to the oxidase described above, an oxidized coenzyme and a coenzyme oxidase may be immobilized on the anode 3. Examples of the oxidized coenzyme include nicotinamide adenine dinucleotide (hereinafter referred to as "$NAD^+$"), nicotinamide adenine dinucleotide phosphate (hereinafter referred to as "$NADP^+$"), flavin adenine dinucleotide (hereinafter referred to as "$FAD^+$"), and pyrrollo-quinoline quinone (hereinafter referred to as "$PQQ^{2+}$"). An example of the coenzyme oxidase includes diaphorase.

As the oxidative decomposition of the vaporized fuel occurs at the anode 3, oxidation-reduction reactions are repeated in which the oxidized coenzymes described above are respectively reduced to NADH, NADPH, FADH, and $PQQH_2$, and the resulting reduced coenzymes return to the oxidized coenzymes by the coenzyme oxidase. Herein, when the reduced coenzymes return to oxidized coenzymes, two electrons are generated.

Moreover, in addition to the oxidases and the oxidized coenzymes described above, an electron-transferring mediator may be immobilized on the anode 3. This is to enhance smoothness of migration of the generated electrons between the electrodes. Examples of the electron-transferring mediator include 2-amino-3-carboxy-1,4-naphthoquinone (ACNQ), vitamin K3, 2-amino-1,4-naphthoquinone (ANQ), 2-amino-3-methyl-1,4-naphthoquinone (AMNQ), 2,3-diamino-1,4-naphthoquinone, metal complexes of osmium (Os), ruthenium (Ru), iron (Fe), cobalt (Co), and the like, viologen compounds such as benzyl viologen, compounds having quinone skeletons, compounds having nicotinamide structures, compounds having riboflavin structures, and compounds having nucleotide-phosphoric acid structures.

(3) Cathode 4

At the cathode 4 of the fuel cell 1 according to the present invention, a reduction reaction occurs with electrons that are released from the anode 3 and transferred through an anode current collector 31 and a cathode current collector 41 described below and with oxygen supplied from the outside.

A material used for the cathode 4 can also be any publicly known material and is not particularly limited as long as the material can be electrically connected to the outside. Examples of the material include metals such as Pt, Ag, Au, Ru, Rh, Os, Nb, Mo, In, Ir, Zn, Mn, Fe, Co, Ti, V, Cr, Pd, Re, Ta, W, Zr, Ge, and Hf; alloys such as alumel, brass, duralumin, bronze, nickelin, platinum-rhodium, hyperco, permalloy, permendur, nickel silver, and phosphor bronze; conductive polymers such as polyacetylenes; carbon materials such as graphite and carbon black; borides such as $HfB_2$, $NbB$, $CrB_2$, and $B_4C$; nitrides such as TiN and ZrN; silicides such as $VSi_2$, $NbSi_2$, $MoSi_2$, and $TaSi_2$; and composite materials of these.

An enzyme may be optionally immobilized on the cathode 4. The type of the enzyme that can be immobilized on the cathode 4 is not particularly limited as long as the enzyme has oxidase activity that uses oxygen as reaction substrate, and can be freely selected when necessary. Examples of the enzyme include laccase, bilirubin oxidase, and ascorbate oxidase.

Furthermore, in addition to the enzyme described above, an electron-transferring mediator may be immobilized on the cathode 4. This is to enhance smoothness of reception of electrons that are generated at the anode 3 and transferred through the anode current collector 31 and the cathode current collector 41. The type of the electron-transferring mediator that can be immobilized on the cathode 4 is not particularly limited, and can be freely selected when necessary. For example, ABTS (2,2'-azinobis(3-ethylbenzoline-6-sulfonate)), $K_3[Fe(CN)_6]$, or the like can be used.

(4) Proton Conductor 6

The anode 3 and the cathode 4 described above are connected to each other in a state in which protons can be conducted. The connection method is not particularly limited. For example, as shown in the embodiment of FIG. 1, the anode 3 and the cathode 4 are disposed in the fuel cell 1 so as to face each other through a proton conductor 6, whereby the anode 3 and the cathode 4 can be connected to each other in a state in which protons can be conducted.

A material used for the proton conductor 6 can be any publicly known material and is not particularly limited as long as the material has no electron conductivity and is an electrolyte that can transport $H^+$. For example, an electrolyte containing a buffer substance can be used. Examples of the buffer substance include dihydrogen phosphate ions ($H_2PO_4^-$) produced from sodium dihydrogen phosphate ($NaH_2PO_4$), potassium dihydrogen phosphate ($KH_2PO_4$), or the like, 2-amino-2-hydroxymethyl-1,3-propanediol (abbreviated as Tris), 2-(N-morpholino)ethanesulfonic acid (MES), cacodylic acid, carbonic acid ($H_2CO_3$), hydrogen citrate ions, N-(2-acetamido)iminodiacetic acid (ADA), piperazine-N,N'-bis(2-ethanesulfonic acid) (PIPES), N-(2-acetamido)-2-aminoethanesulfonic acid (ACES), 3-(N-morpholino)propanesulfonic acid (MOPS), N-2-hydroxyethylpiperazine-N'-2-ethanesulfonic acid (HEPES), N-2-hydroxyethylpiperazine-N'-3-propanesulfonic acid (HEPPS), N-[tris(hydroxymethyl)methyl]glycine (abbreviated as Tricine), glycylglycine, N,N-bis(2-hydroxyethyl)glycine (abbreviated as Bicine), imidazole, triazole, pyridine derivatives, bipyridine derivatives, and compounds having an imidazole ring such as imidazole derivatives (histidine, 1-methylimidazole, 2-methylimidazole, 4-methylimidazole, 2-ethylimidazole, ethyl imidazole-2-carboxylate, imidazole-2-carboxaldehyde, imidazole-4-carboxylic acid, imidazole-4,5-dicarboxylic acid, imidazol-1-yl-acetic acid, 2-acetylbenzimidazole, 1-acetylimidazole, N-acetylimidazole, 2-aminobenzimidazole, N-(3-aminopropyl)imidazole, 5-amino-2-(trifluoromethyl)benzimidazole, 4-azabenzimidazole, 4-aza-2-mercaptobenzimidazole, benzimidazole, 1-benzylimidazole, and 1-butylimidazole).

(5) Anode Current Collector 31 and Cathode Current Collector 41

The anode current collector 31 and the cathode current collector 41 are each connected to an external circuit so that electrons released from the anode 3 are transferred from the anode current collector 31 to the cathode current collector 41 through the external circuit and supplied to the cathode 4.

In this embodiment, the anode current collector 31 is formed such that a vaporized fuel can pass through the anode current collector 31 and the cathode current collector 41 is formed such that oxygen can pass through the cathode current collector 41, the anode current collector 31 and the cathode current collector 41 sandwiching the anode 3 and the cathode 4. However, the structure is not limited thereto. For example, the anode current collector 31 (cathode current collector 41) may be disposed between the anode 3 (cathode 4) and the proton conductor 6 or the anode current collector 31 (cathode current collector 41) may extend through the anode 3 (cathode 4).

A material used for the anode current collector 31 and the cathode current collector 41 can also be any publicly known material and is not particularly limited as long as the material can be electrically connected to the outside. Examples of the material include metals such as Pt, Ag, Au, Ru, Rh, Os, Nb, Mo, In, Ir, Zn, Mn, Fe, Co, Ti, V, Cr, Pd, Re, Ta, W, Zr, Ge, and Hf; alloys such as alumel, brass, duralumin, bronze, nickelin, platinum-rhodium, hyperco, permalloy, permendur, nickel silver, and phosphor bronze; conductive polymers such as polyacetylenes; carbon materials such as graphite and carbon black; borides such as HfB2, NbB, CrB2, and B4C; nitrides such as TiN and ZrN; silicides such as VSi2, NbSi2, MoSi2, and TaSi2; and composite materials of these.

Figure 2:
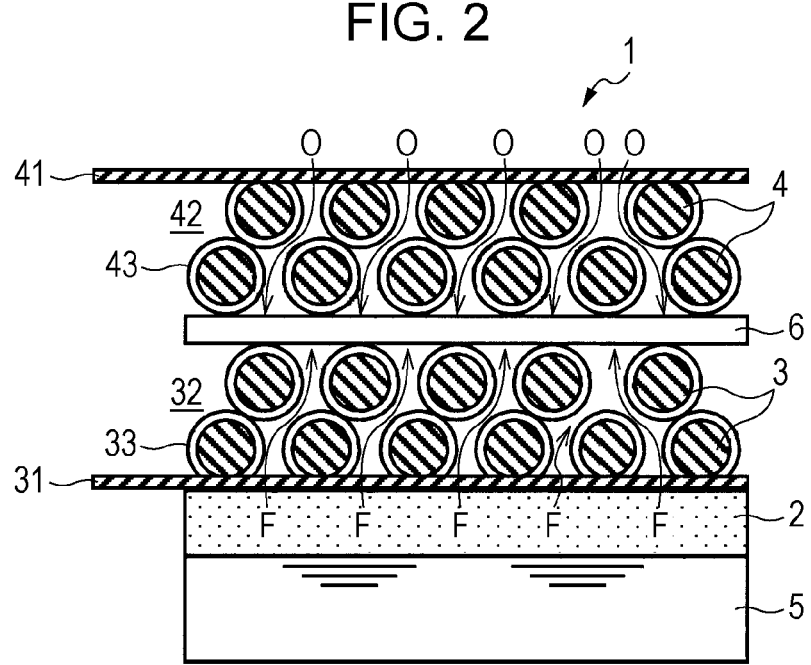
FIG. 2 is a schematic sectional view showing an embodiment (second embodiment) that is different from that of the fuel cell 1 shown in FIG. 1 according to the present invention.

FIG. 2 is a schematic sectional view showing an embodiment (second embodiment) that is different from that of the fuel cell 1 shown in FIG. 1 according to the present invention.

In the fuel cell 1 according to this embodiment, air layers 32 and 42 (hereinafter referred to as "anode air layer 32" and "cathode air layer 42") are formed inside the anode 3 and the cathode 4, respectively. The anode air layer 32 and the cathode air layer 42 are provided inside the anode 3 and the cathode 4 in such a manner, whereby a vaporized fuel can be infiltrated into the inner portion of the anode 3 as indicated by arrow F in FIG. 2 and oxygen required for the reaction can be infiltrated into the inner portion of the cathode 4 as indicated by arrow O in FIG. 2.

The anode air layer 32 and the cathode air layer 42 can be formed, for example, by employing a conductive material having a porous structure for the anode 3 and the cathode 4. The pore size of the porous structure is not particularly limited, and can be freely designed. The pore size is, for example, 9 nm or more and 1 mm or less, preferably 1 μm or more and 1 mm or less, and more preferably 1 μm or more and 600 μm or less.

Furthermore, in the fuel cell 1 according to the present invention, electrolyte layers 33 and 34 (hereinafter referred to as "anode electrolyte layer 33" and "cathode electrolyte layer 43") having proton conductivity are stacked on surfaces of the anode 3 and the cathode 4, respectively.

The anode electrolyte layer 33 and the cathode electrolyte layer 43 have the function of transporting $H^+$ generated by the reaction at the anode 3 from the anode electrolyte layer 33 to the cathode electrolyte layer 43 through the proton conductor 6 and then to the cathode 4. Furthermore, water produced by the reaction at the cathode 4 is returned from the cathode electrolyte layer 43 to the anode electrolyte layer 33 through the proton conductor 6 and then to the anode 3. The water functions as water required for the reaction at the anode 3. As described above, in the fuel cell 1 according to the present invention, the control of water at the cathode 4 can be easily performed.

An electrolyte used for the anode electrolyte layer 33 and the cathode electrolyte layer 43 is not particularly limited as long as the electrolyte has no electron conductivity and can transport $H^+$, and any publicly known electrolyte can be freely employed. For example, an electrolyte containing a buffer substance can be used. Examples of the buffer substance include dihydrogen phosphate ions ($H_2PO_4^-$) produced from sodium dihydrogen phosphate ($NaH_2PO_4$), potassium dihydrogen phosphate ($KH_2PO_4$), or the like, 2-amino-2-hydroxymethyl-1,3-propanediol (abbreviated as Tris), 2-(N-morpholino)ethanesulfonic acid (MES), cacodylic acid, carbonic acid ($H_2CO_3$), hydrogen citrate ions, N-(2-acetamido)iminodiacetic acid (ADA), piperazine-N,N'-bis(2-ethanesulfonic acid) (PIPES), N-(2-acetamido)-2-aminoethanesulfonic acid (ACES), 3-(N-morpholino)propanesulfonic acid (MOPS), N-2-hydroxyethylpiperazine-N'-2-ethanesulfonic acid (HEPES), N-2-hydroxyethylpiperazine-N'-3-propanesulfonic acid (HEPPS), N-[tris(hydroxymethyl)methyl]glycine (abbreviated as Tricine), glycylglycine, N,N-bis(2-hydroxyethyl)glycine (abbreviated as Bicine), imidazole, triazole, pyridine derivatives, bipyridine derivatives, and compounds having an imidazole ring such as imidazole derivatives (histidine, 1-methylimidazole, 2-methylimidazole, 4-methylimidazole, 2-ethylimidazole, ethyl imidazole-2-carboxylate, imidazole-2-carboxaldehyde, imidazole-4-carboxylic acid, imidazole-4,5-dicarboxylic acid, imidazol-1-yl-acetic acid, 2-acetylbenzimidazole, 1-acetylimidazole, N-acetylimidazole, 2-aminobenzimidazole, N-(3-aminopropyl)imidazole, 5-amino-2-(trifluoromethyl)benzimidazole, 4-azabenzimidazole, 4-aza-2-mercaptobenzimidazole, benzimidazole, 1-benzylimidazole, and 1-butylimidazole).

In this embodiment, an enzyme, a microbe, a coenzyme, an electron-transferring mediator, or the like can also be optionally immobilized on the anode 3 and the cathode 4 as in the first embodiment. The immobilizing method is not particularly limited, and, for example, there can be employed a method in which an enzyme, a microbe, a coenzyme, an electron-transferring mediator, or the like is immobilized on the anode electrolyte layer 33 and the cathode electrolyte layer 43.

Figure 3:
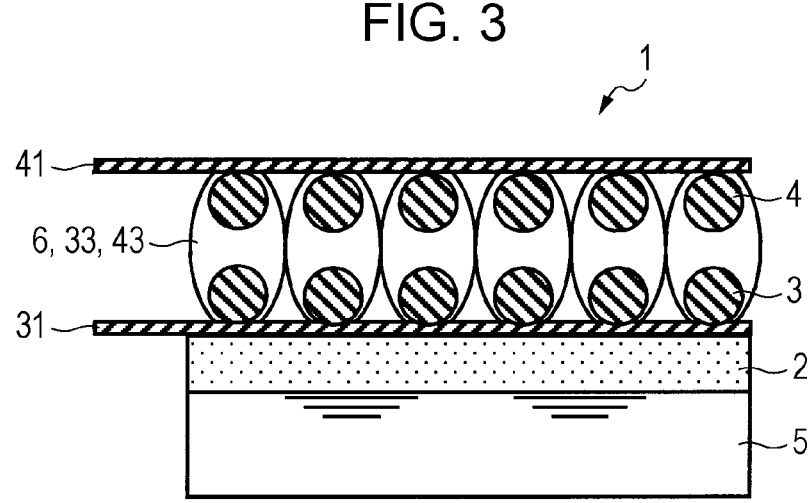
FIG. 3 is a schematic sectional view showing an embodiment (third embodiment) that is different from those of the fuel cells shown in FIGS. 1 and 2 according to the present invention.

FIG. 3 is a schematic sectional view showing an embodiment (third embodiment) that is different from those of the fuel cells 1 shown in FIGS. 1 and 2 according to the present invention.

In the fuel cell 1 according to this embodiment, the anode electrolyte layer 33, the cathode electrolyte layer 43, and the proton conductor 6 are formed of the same electrolyte, whereby the anode 3 and the cathode 4 are connected to each other in a state in which protons can be conducted.

Examples of the electrolyte and the immobilization of an enzyme, a microbe, a coenzyme, an electron-transferring mediator, or the like are the same as those in the second embodiment.

<Power Supply Device>

Figure 4:
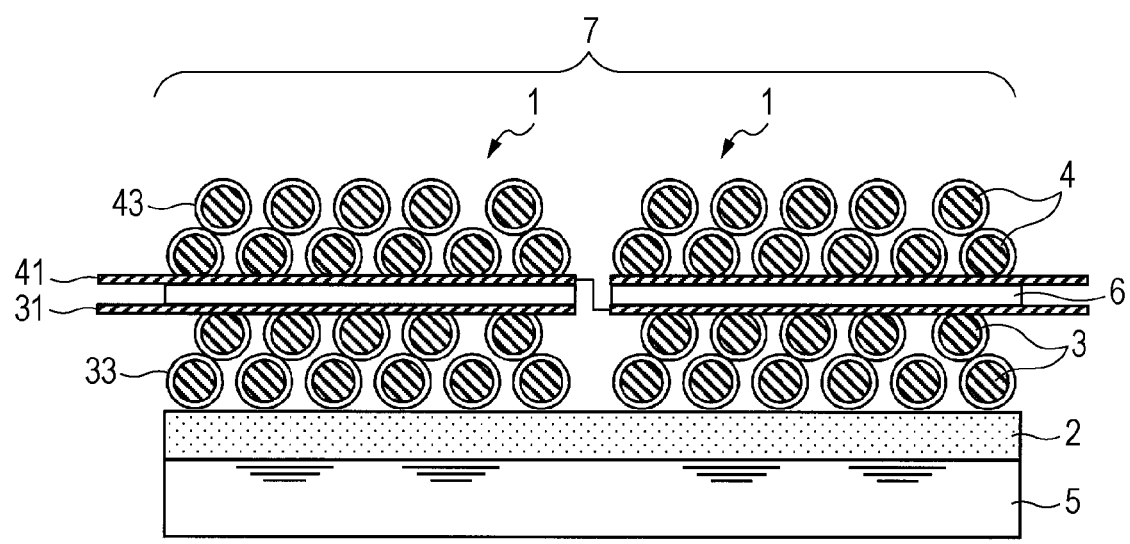
FIG. 4 is a schematic sectional view showing an embodiment (first embodiment) of a power supply device 7 according to the present invention.

FIG. 4 is a schematic sectional view showing an embodiment (first embodiment) of a power supply device 7 according to the present invention.

The power supply device 7 according to the present invention includes at least two of the fuel cells 1 described above that are connected in series. Since existing biofuel cells have output lower than that of other cells, a plurality of biofuel cells need to be connected to one another in series to achieve high output. However, if biofuel cells are connected to one another in series to achieve high output, a fuel needs to be supplied to each of the plurality of biofuel cells, which poses problems in that fuel supply becomes complicated and it takes a long time before power generation.

However, in the power supply device 7 according to the present invention, since power generation is performed by supplying a vaporized fuel, a fuel can be simultaneously supplied to the anodes 3 of the at least two fuel cells 1. Thus, the power supply device 7 can achieve high output through a simple fuel supply.

Furthermore, the fuels of existing biofuel cells are liquid fuels. Therefore, when biofuel cells are connected to one another in series as in the power supply device 7 according to the present invention, the region corresponding to the fuel-vaporizing layer represented by reference numeral 2 in FIG. 4 needs to be filled with a liquid fuel to supply a fuel to at least two anodes. In this case, ions migrate between the at least two anodes through the fuel because a liquid fuel has a property of being an electrolyte. As a result, power generation cannot be performed. Thus, means for preventing ions from migrating between the at least two anodes after the supply of a liquid fuel is required to perform power generation.

However, in the power supply device 7 according to the present invention, since a vaporized fuel is supplied and thus a liquid fuel does not contact the anode 3, a fuel can be simultaneously supplied to the at least two anodes 3 while ions are prevented from migrating between the at least two anodes 3.

In the power supply device 7 according to this embodiment, two fuel cells 1 are connected to each other in series, but the number is not particularly limited as long as at least two fuel cells 1 are connected to one another in series. The number of the fuel cells 1 can be freely designed and changed in accordance with the amount of electric power required.

The connection method of the fuel cells 1 is not particularly limited as long as the connection is a serial connection. For example, as shown in FIG. 4, the anode current collector 31 of one fuel cell 1 is connected to the cathode current collector 41 of the other fuel cell 1, whereby at least two fuel cells 1 can be connected to one another in series.

Figure 5:
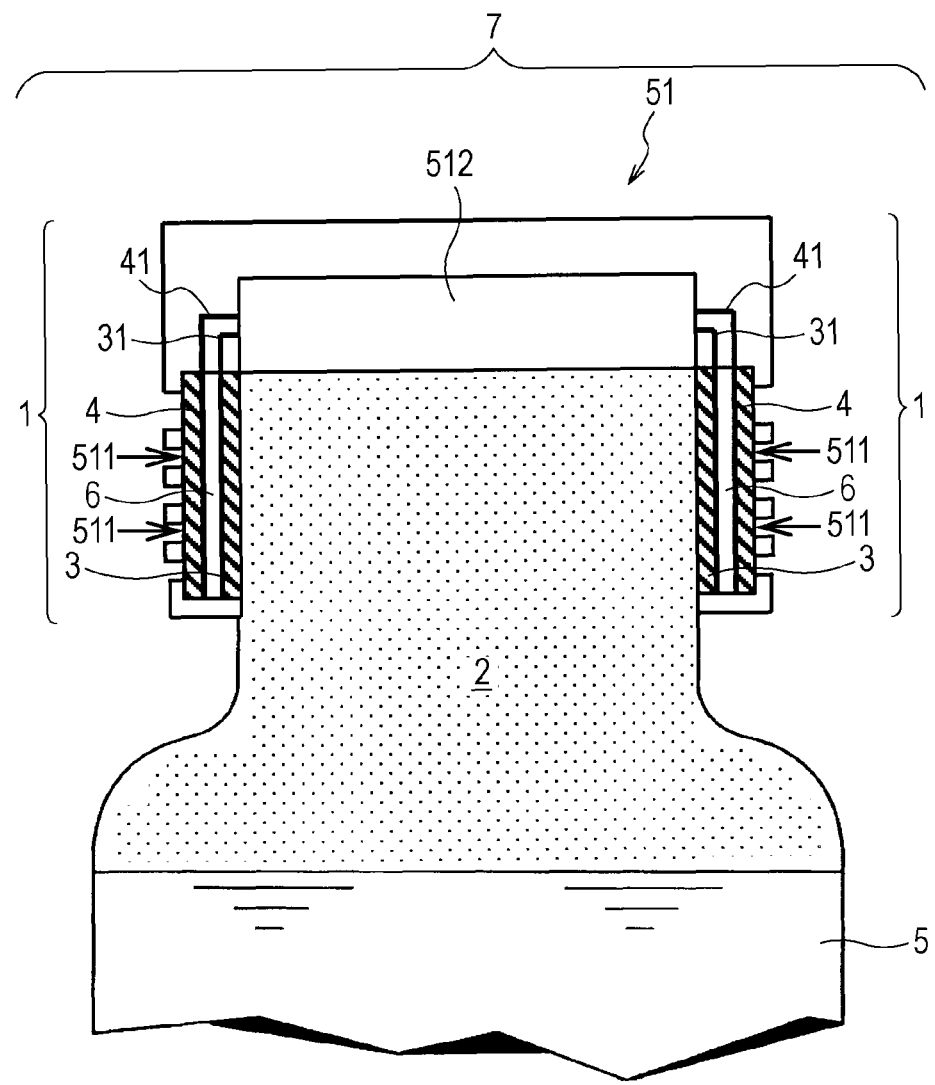
FIG. 5 is a schematic sectional view showing an embodiment (second embodiment) that is different from that of the power supply device 7 shown in FIG. 4 according to the present invention.

FIG. 5 is a schematic sectional view showing an embodiment (second embodiment) that is different from that of the power supply device 7 shown in FIG. 4 according to the present invention.

In the power supply device 7 according to this embodiment, the fuel cells 1 are connected to one another in series through a lid member 51. The lid member 51 can hermetically seal the fuel-storing member 5. In addition, the anodes 3 of the fuel cells 1 are disposed so as to face in directions toward the inside of the lid member 51. Note that, in the power supply device 7 according to this embodiment, the fuel cells 1 are disposed on side walls of the lid member 51, but the arrangement places of the fuel cells 1 are not particularly limited as long as each of the anodes 3 is accessible to a vaporized fuel. The fuel cells 1 may also be disposed on an upper surface of the lid member 51 in addition to the side walls of the lid member 51.

Electrons are released by vaporizing a fuel stored in the fuel-storing member 5 in a liquid state, supplying the vaporized fuel to the anode 3, and causing an oxidation reaction of the vaporized fuel at the anode 3. Subsequently, the electrons released from the anode 3 are transferred to the cathode 4 through the anode current collector 31 and the cathode current collector 41.

At the cathode 4, a reduction reaction occurs with electrons transferred from the anode 3 through the anode current collector 31 and the cathode current collector 41 and oxygen supplied from the outside. Therefore, the cathode 4 side of the lid member 51 needs to have a structure with air permeability. For example, a structure in which oxygen can be supplied to the cathode 4 can be obtained by forming air inlets 511 as in this embodiment. In addition, oxygen can be supplied to the cathode 4 by forming a membrane or film having air permeability on the cathode 4 side of the lid member 51.

The power supply device 7 according to this embodiment includes an electronic controller 512 inside the lid member 51 of the fuel-storing member 5. When electric energy generated in the fuel cell 1 is supplied to the outside, the electronic controller 512 has the function of controlling the supply of the electric energy. Specifically, a boosting circuit or the like is disposed in the electronic controller 512, and the voltage of the electric energy generated in the fuel cell 1 is controlled to be a voltage within the specifications of an external device (e.g., electronic apparatus) to which electric power is to be supplied.

<Electronic Apparatus>

Since the fuel cell 1 according to the present invention can efficiently provide high output current and voltage through a simple fuel supply, the fuel cell 1 can be suitably used for various publicly known electronic apparatuses.

The structure, function, and the like of the electronic apparatuses are not particularly limited as long as the electronic apparatuses can use at least one or a plurality of fuel cells 1 according to the present invention, and the electronic apparatuses include any apparatus that electrically operates. Examples of the electronic apparatuses include cellular phones, mobile apparatuses, robots, personal computers, game machines, car-mounted apparatuses, household electric appliances, electronic apparatuses such as industrial products, mobile units such as automobiles, two-wheeled vehicles, aircraft, rockets, and spacecraft, testing apparatuses, power sources for pacemakers, medical apparatuses such as a power source of in vivo devices including biosensors, power generation systems such as a system for generating electric energy by decomposing kitchen waste, and cogeneration systems.

Example 1

In Example 1, a fuel cell according to the present invention was manufactured and power generation was actually performed.

<Manufacturing of Fuel Cell>

First of all, an anode used for a fuel cell was produced in the manner described below. First, various solutions (1) to (6) were prepared. A 100 mM sodium dihydrogen phosphate ($NaH_2PO_4$) buffer solution (I.S.=0.3, pH=7.0) was used as a buffer solution.

(1) ANQ Acetone Solution

To prepare an ANQ acetone solution (1), 10 to 50 mg of 2-amino-1,4-naphthoquinone (ANQ) (synthetic compound) was weighed and dissolved in 1 ml of acetone solution.

(2) DI Enzyme Buffer Solution

To prepare a DI enzyme buffer solution (2), 5 to 10 mg of diaphorase (DI) (EC1. 6.99.-, B1D111 available from UNITIKA Ltd.) was weighed and dissolved in 1.0 ml of buffer solution.

(3) NADH Buffer Solution

To prepare an NADH buffer solution (3), 30.0 to 60.0 mg of reduced nicotinamide adenine dinucleotide (NADH) (N-8129 available from Sigma-Aldrich Co.) was weighed and dissolved in 0.1 ml of buffer solution.

(4) ADH Enzyme Buffer Solution

To prepare an ADH enzyme buffer solution (4), 10 to 15 mg of alcohol dehydrogenase (ADH) was weighed and dissolved in 1.0 ml of buffer solution.

(5) PLL Aqueous Solution

To prepare a PLL aqueous solution (5), an appropriate weight of poly-L-lysine hydrobromide (PLL) (164-16961 available from Wako) was weighed and dissolved in ion-exchange water such that 1 to 2 wt % PLL aqueous solution was obtained.

(6) PAAcNa Aqueous Solution

To prepare a PAAcNa aqueous solution (6), an appropriate weight of sodium polyacrylate (PAAcNa) (041-00595 available from Aldrich Co.) was weighed and dissolved in ion-exchange water such that 0.01 to 0.1 wt % PAAcNa aqueous solution was obtained.

The various solutions prepared as described above were applied to porous carbon (available from TOKAI CARBON Co., Ltd.) in the amounts shown in Table 1 in the order of (1) to (6) using a microsyringe. Subsequently, the solutions were appropriately dried to produce an enzyme/electron mediator immobilized electrode (anode 3).

TABLE 1

| | |
|---|---|
| (1) ANQ acetone solution | 7 μL |
| (2) DI enzyme buffer solution | 10 μL |
| (3) NADH buffer solution | 10 μL |
| (4) ADH enzyme buffer solution | 10 μL |
| (5) PLL aqueous solution | 10 μL |
| (6) PAAcNa aqueous solution | 4 μL |

Next, a cathode 4 used for the fuel cell was produced in the manner described below. A commercially available carbon felt (BO050 available from TORAY) was used as a porous carbon. The carbon felt was impregnated with 80 μL of hexacyanoferrate ions (100 mM), 80 μL of poly-L-lysine (1 wt %), and 80 μL of bilirubin oxidase (BOD) solution (50 mg/mL) in that order, and then appropriately dried to produce an enzyme/electron mediator immobilized electrode (cathode 4).

A cellophane as a proton conductor 6 was sandwiched between the cathode 4 and the anode 3 produced as described above. The cathode 4, the proton conductor 6 (cellophane), and the anode 3 were arranged in that order from above as shown in FIG. 6 to assemble a fuel cell 1. Note that, although not shown in the drawing, a cathode current collector 41 and an anode current collector 31 were formed of stainless steel.

<Measurement>

To immerse the anode 3, the proton conductor 6 (cellophane), and the cathode 4 in a phosphoric acid solution, 400 μL of 1 M phosphoric acid solution was added from the anode 3 side. Subsequently, a reference electrode (Ag|AgCl) was disposed so as to contact the cellophane immersed in the phosphoric acid solution as shown in FIG. 6, and an electric potential was measured.

As shown in FIG. 6, a fuel-storing member 5 containing an ethanol solution was placed below the anode 3, and a potential of the anode 3 and a cell voltage were measured using a voltmeter. After a while, as shown in FIG. 7, the potential of the anode 3 decreased and the cell voltage reached 0.69 V. Thus, it was confirmed that an ethanol vapor was supplied to the anode 3 as a fuel and an oxidation reaction of ethanol facilitated by an enzyme occurred on an enzyme-immobilized electrode.

Figure 8:
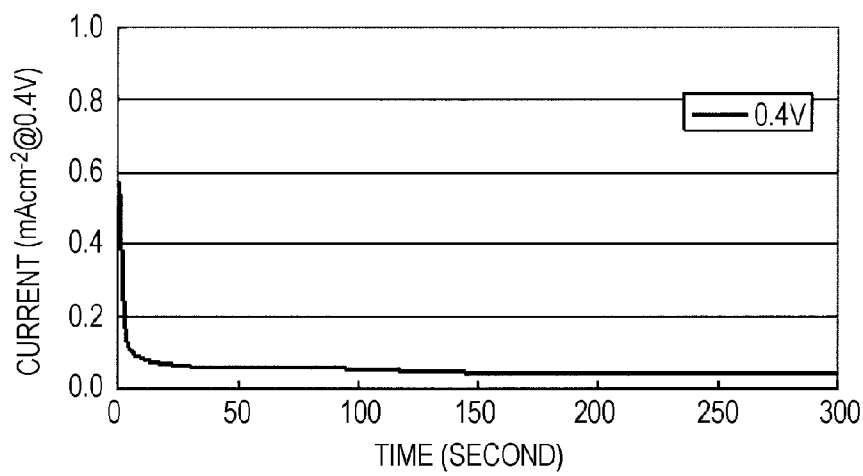
FIG. 8 is a graph substituted for drawing and showing a change in an output value over time when the cell voltage is set to 0.4 V in Example 1.
Figure 9:
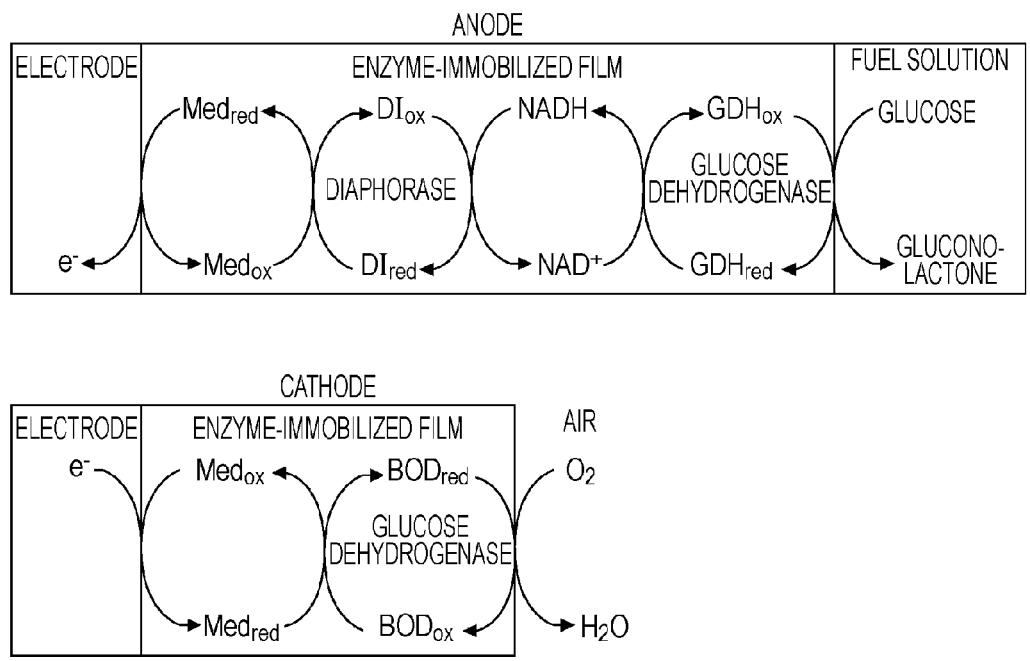
FIG. 9 is a conceptual diagram showing a reaction scheme of a biofuel cell.

Subsequently, the cell voltage was set to 0.4 V and the output value was measured over time (chronoamperometry method). FIG. 8 shows the result. The output value after five minutes was 17.61 μW/cm$^2$.

In Example 1, the power generation performed by the fuel cell 1 (vaporized ethanol fuel) according to the present invention was confirmed.

INDUSTRIAL APPLICABILITY

The fuel cell according to the present invention can efficiently provide high output current and voltage through a simple fuel supply compared with an existing biofuel cell. Therefore, the fuel cell can be utilized as a power source of various electronic apparatuses.

Furthermore, if beverages, cosmetic products, and the like that people use in everyday life are used as a fuel, a fuel can be supplied at any place when necessary. Thus, the fuel cell can serve as a power source used when power supply is stopped in the event of a disaster or the like.

Furthermore, if a fuel that is edible, drinkable, or safe for contact with the human body is used, the structure of the fuel cell can be designed freely without worrying about fuel leakage or the like. Therefore, an entertaining effect and a visual aesthetic effect can be added to electronic apparatuses equipped with the fuel cell according to the present invention.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell comprising:
a fuel vapor layer formed through vaporization of a non-gaseous fuel;
an anode to which a vaporized fuel is supplied from the fuel vapor layer; and
a cathode connected to the anode in a state in which protons can be conducted,
wherein the fuel cell is configured to generate electricity through progress of an oxidation reduction reaction using an enzyme as a catalyst, and
wherein the fuel vapor layer consists solely of a gaseous phase and is configured as a spacer separating the non-gaseous fuel from the anode.

2. The fuel cell according to claim 1 further comprising:
an anode current collector through which the fuel can pass, the anode current collector being connected to the anode; and
a cathode current collector through which oxygen can pass, the cathode current collector being connected to the cathode.

3. The fuel cell according to claim 1 further comprising a fuel-storing member that stores the fuel in a liquid state.

4. The fuel cell according to claim 1, wherein:
an air layer through which the vaporized fuel can pass is formed inside the anode; and
an air layer through which air can pass is formed inside the cathode.

5. The fuel cell according to claim 1, wherein the anode and the cathode have a porous structure.

6. The fuel cell according to claim 1, wherein an electrolyte layer having proton conductivity is stacked on a surface of the anode and the cathode.

7. The fuel cell according to claim 1, wherein an enzyme is immobilized on the anode and the cathode.

8. The fuel cell according to claim 7 wherein the enzyme is immobilized on the electrolyte layer.

9. The fuel cell according to claim 7 wherein the enzyme immobilized on the anode and the cathode includes at least an oxidase.

10. The fuel cell according to claim 1, wherein an electron-transferring mediator is immobilized on the anode and the cathode.

11. The fuel cell according to claim 7, wherein the enzyme immobilized on the anode includes at least an oxidized coenzyme.

12. The fuel cell according to claim 11 wherein the enzyme immobilized on the anode includes a coenzyme oxidase.

13. The fuel cell according to claim 1, further comprising a fuel storage member in fluid communication with the fuel vapor layer and provided apart from the anode.

* * * * *